(No Model.)
G. W. PRIOR.
MILLSTONE DRESS.
No. 294,911. Patented Mar. 11, 1884.
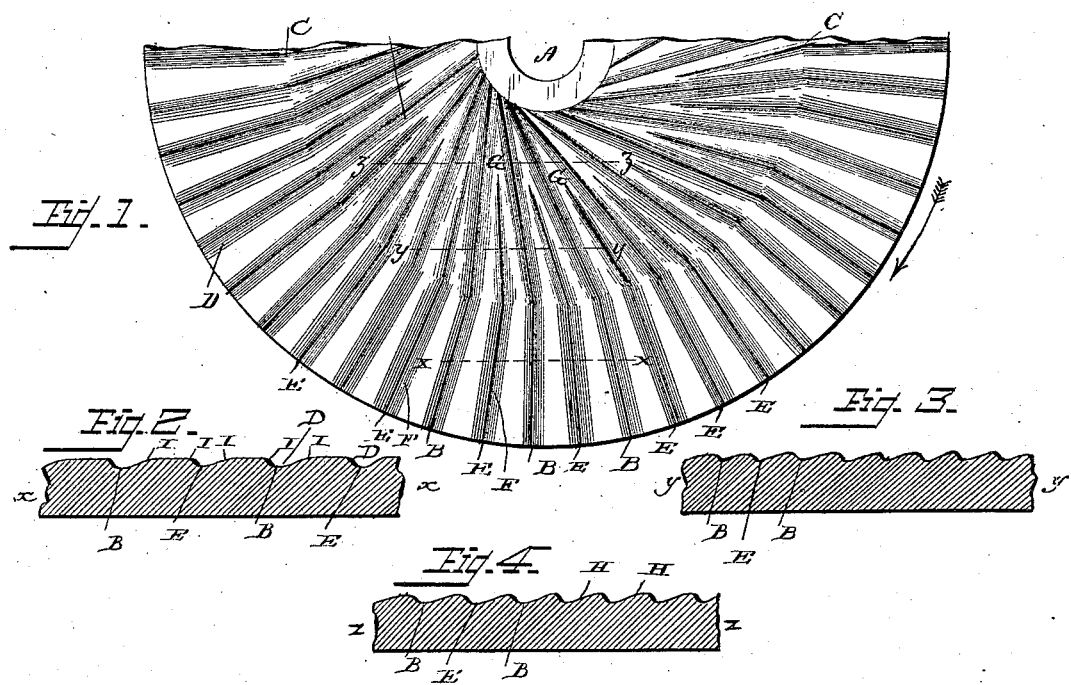
WITNESSES
E. G. Siggers.
W. C. Dashiell.
Geo. W. Prior,
INVENTOR
by C. A. Snow & Co.
Attorneys

UNITED STATES PATENT OFFICE.

GEORGE WASHINGTON PRIOR, OF BOEGER'S STORE, MISSOURI.

MILLSTONE-DRESS.

SPECIFICATION forming part of Letters Patent No. 294,911, dated March 11, 1884.

Application filed August 22, 1883. (No model.)

*To all whom it may concern:*

Be it known that I, GEORGE W. PRIOR, a citizen of the United States, residing at Boeger's Store, in the county of Osage and State of Missouri, have invented a new and useful Millstone-Dress, of which the following is a specification, reference being had to the accompanying drawings.

This invention relates to millstone-dresses, and its object is to provide a simple and efficient dress, whereby the grinding can be effected with less power or pressure than heretofore, and a better yield of flour is secured.

In the drawings, Figure 1 is a top view of a portion of a millstone having my improved dress. Fig. 2 is a detail cross-section on the line $x\ x$, Fig. 1. Fig. 3 is a detail cross-section on the line $y\ y$, Fig. 1. Fig. 4 is a detail cross-section on the line $z\ z$, Fig. 1.

Referring to the drawings, A designates the eye of the millstone, and B the leading furrows, which are drafted tangentially from the center of the stone outward for about two-thirds of the distance to the edge to the point C. The draft or tangent of the furrows from the center of the stone to this point C is preferably one inch to the foot; but it can be graduated to run more or less, according to the quality and size of the stone. From the point C the furrows are carried out to the edge of the stone at an angle to their main drafted portions and extend radially from the eye or center of the stone. The furrows are preferably of uniform depth, and may have a width of about one inch.

E designates the short furrows, which run from the edge of the stone about two-thirds the distance to the center; but this length may be varied to one-third the distance, according to the motion and quality of the stone. These small or short furrows are formed between the leading furrows B, and follow the contour of the same, and have about a corresponding draft, F.

G designates the lands, which are rounded or convexed, as shown at H, from the center to between one-third and two-thirds the distance to the edge, the length and size of these rounded portions being regulated according to the motion, size, and quality of the stone. By reason of these rounded or convexed lands at the eye of the stone, the grain will be mashed after the manner of rollers, while the skirts of the stone are adapted to clean the flour from the bran, and to better effect this each side or etch I of the land on the skirt is rounded, as shown, so as not to cut the bran in grinding. At the skirt the lands are flat, and are preferably two and one-half inches wide, while the furrows have a width of one inch. Owing to the lands being convexed and having rounded edges, the bran will not be cut in grinding, and the stone will operate with an effect similar to the roller-grinding system.

The operation and advantages secured by my improved dress will be readily understood and appreciated. The dress is simple, and a superior product is secured with less pressure and power.

I claim as my invention—

A millstone-dress comprising the leading furrows, extending from the center or eye of the stone for about two-thirds of the distance to the edge of the stone, being drafted or carried tangentially to this point, and then carried out to the edge of the stone radially in relation to the eye of the stone, the short furrows between the leading furrows, carried from the edge of the stone inward for a suitable distance, and the lands, rounded or convexed for some distance from the eye or center of the stone, and having each side or etch of their flat outer portions also rounded, substantially as set forth.

In testimony that I claim the foregoing as my own I have hereto affixed my signature in presence of two witnesses.

GEORGE WASHINGTON PRIOR.

Witnesses:
WM. J. WHITE,
THOMAS LAMBETH.